United States Patent
Aue et al.

(10) Patent No.: US 9,876,291 B2
(45) Date of Patent: Jan. 23, 2018

(54) METHOD FOR A TENSION PROOF CLOSURE OF THE END OF AN ENERGY CABLE

(71) Applicant: NEXANS, Paris (FR)

(72) Inventors: Volker Aue, Dortmund (DE); Eduard Schramm, Hannover (DE)

(73) Assignee: NEXANS, Paris (FR)

( * ) Notice: Subject to any disclaimer, the term of this patent is extended or adjusted under 35 U.S.C. 154(b) by 247 days.

(21) Appl. No.: 14/630,794

(22) Filed: Feb. 25, 2015

(65) Prior Publication Data

US 2015/0255899 A1    Sep. 10, 2015

(30) Foreign Application Priority Data

Mar. 6, 2014  (EP) .................................... 14305321

(51) Int. Cl.

| | |
|---|---|
| *H01R 43/00* | (2006.01) |
| *H05K 13/00* | (2006.01) |
| *H01R 11/12* | (2006.01) |
| *H02G 1/08* | (2006.01) |
| *H02G 1/10* | (2006.01) |
| *H01B 7/20* | (2006.01) |
| *H01B 7/22* | (2006.01) |

(Continued)

(52) U.S. Cl.
CPC ............ *H01R 11/12* (2013.01); *F03D 9/255* (2017.02); *H01B 7/20* (2013.01); *H01B 7/228* (2013.01); *H01R 43/02* (2013.01); *H02G 1/081* (2013.01); *H02G 1/10* (2013.01); *H02G 9/12* (2013.01); *Y10T 29/49169* (2015.01); *Y10T 29/49174* (2015.01); *Y10T 29/49179* (2015.01)

(58) Field of Classification Search
CPC ............... E02B 15/0835; E02B 15/085; Y10T 29/49826; Y10T 29/49174; Y10T 29/53213; Y10T 29/49169; H01R 13/025
USPC .................. 29/854, 855, 857, 860, 864, 867
See application file for complete search history.

(56) References Cited

U.S. PATENT DOCUMENTS 5,878,851 A * 3/1999 Carlson ................... F16F 9/067
                                                              188/267
8,541,683 B2 * 9/2013 Worrall .................. H02G 15/06
                                                              174/82

(Continued)

FOREIGN PATENT DOCUMENTS

GB        2183402        6/1987

OTHER PUBLICATIONS

Search Report dated 2014.

*Primary Examiner* — Thiem Phan
(74) *Attorney, Agent, or Firm* — Sofer & Haroun, LLP

(57) ABSTRACT

A method for the tension proof closing of the end of an energy cable in which an energy cable is used whose center axis containing the electrical transmission elements is surrounded by a tension proof reinforcement of metal wires. Initially, the reinforcement at the end of the energy cable is removed over a predetermined length. Subsequently, a pipe piece of metal, which tightly surrounds the end of the remaining reinforcement, is placed onto the end of the remaining reinforcement. Finally, a cup shaped tubular elongated sleeve of metal is pushed onto the end of the energy cable and is connected in a tension proof manner to the pipe piece which has, at its free end facing away from the pipe piece, a device suitable for mounting a tension element. In addition, a device manufactured by the method is proposed.

7 Claims, 2 Drawing Sheets

(51) Int. Cl.
*H01R 43/02* (2006.01)
*F03D 9/25* (2016.01)
*H02G 9/12* (2006.01)

(56) References Cited

U.S. PATENT DOCUMENTS

2010/0314151 A1    12/2010  Worrall et al.
2014/0182878 A1*    7/2014  Quaggia ................ H02G 15/06
                                                    174/73.1

* cited by examiner

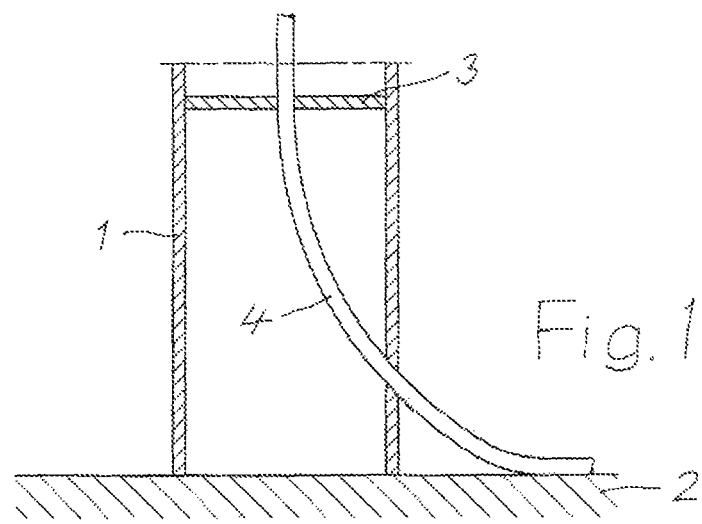
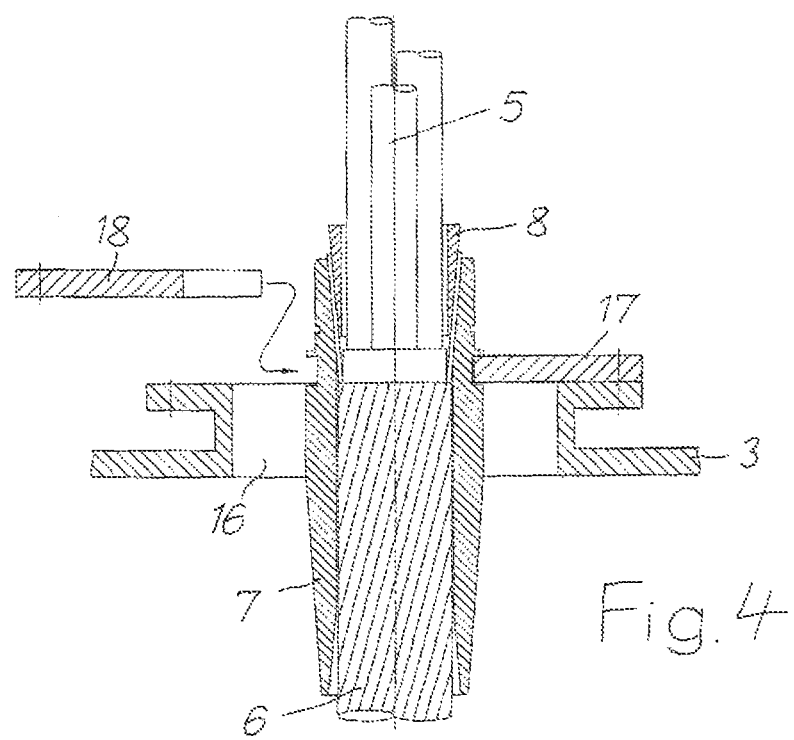

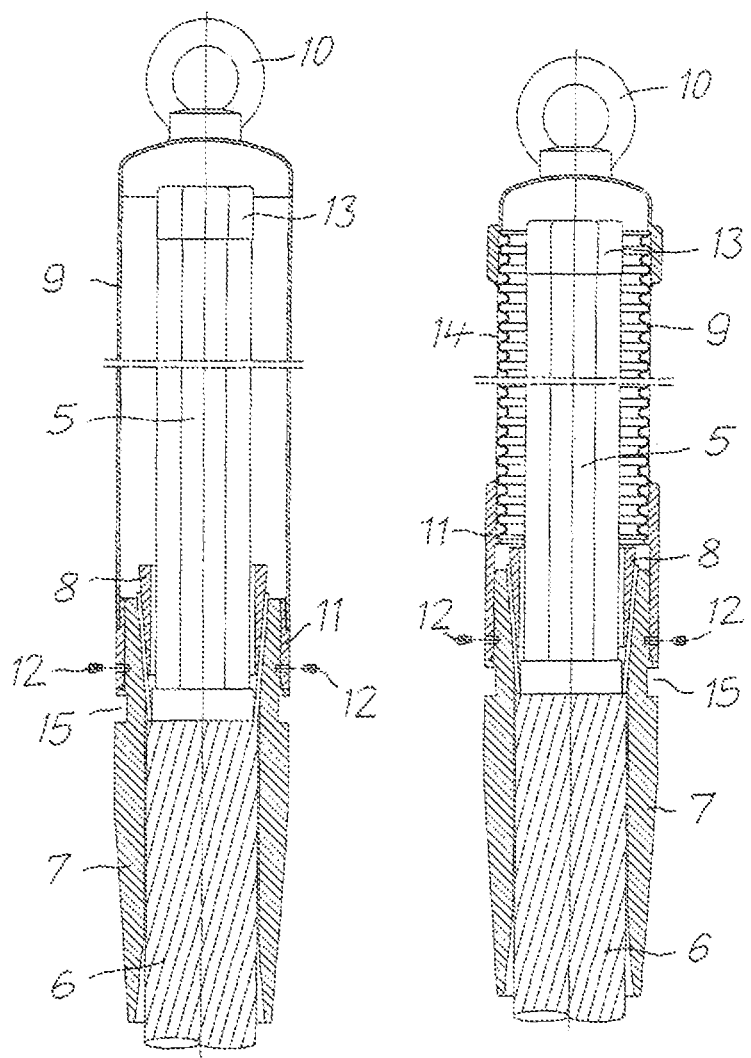

METHOD FOR A TENSION PROOF CLOSURE OF THE END OF AN ENERGY CABLE

RELATED APPLICATIONS

This application claims the benefit of priority from EP 14 305 321.3, filed on Mar. 6, 2014, the entirety of which is incorporated by reference.

BACKGROUND

Field of the Invention

The invention relates to a method for closing the end of an energy cable in a tension. Proof manner whose center axis, containing the transmission elements, is surrounded by a tension proof reinforcement consisting of metal wires, as well as a device manufactured by the method.

Description of Related Art

Electrical cables of all types are closed off by means of appropriate tension proof devices in all those cases in which the cables are to be stretched by means of a tension element for placement in the ground or in cable ducts. Such devices have been known in different embodiments for years. They are called, for example, "tension anchors." Such tension anchors have different appearances in dependence on the type and size of the cables in which they are mounted. After concluding the pulling procedure they are once again removed from the respective cable, which is then available for an electrical connection by means of further devices.

This procedure is basically also applicable in those cases in which the cable end is to be secured in the assembly position in a predetermined position. This is the case, for example, in wind power plants which are placed in the ocean in the offshore area. Such plants have, for example, at a height of approximately 20 m to 50 m above the ocean floor, a platform up to which an energy cable can be mounted and simultaneously secured thereto. Such a placement method is disclosed, for example, in EP 2 696 123 A1. In this known method, the cable is provided at the placement location with a pulling stocking and is pulled by a pre-mounted pipe up to the platform of a wind power plant on which it is secured by means of the pulling stocking.

OBJECTS AND SUMMARY

The method according to the invention and the device mounted at the end of an energy cable relate to the connection of energy cables in wind power plants placed in a wind power plant. Such plants have pillars or foundations with a platform on which are arranged, for example, transformers or switching plants.

The invention is based on the object of providing a method with corresponding device by means of which an energy cable can be closed essentially with an energy cable in such a manner that it can be secured to a support provided at an assembly location without any essential additional assembly steps.

In accordance with the invention, this object is met in that
  initially the reinforcement is removed at the end of the energy cable over a predetermined length,
  subsequently, onto the end of the remaining reinforcement, a pipe piece of metal tightly surrounding the remaining end of the reinforcement is connected, and
  finally a cup like tubular elongated sleeve of metal is pushed onto the end of the energy cable and is connected in a tension proof manner to the pipe piece which has at its free end facing away from the pipe piece a device suitable for mounting a tension element.

By means of this method, the end of an energy cable—called "cable" for short in the following—is closed in a tension proof manner simply and effectively already by the manufacturer in such a way that it can be placed without additional assembly steps and can be fastened to a carrier. The cable can be transported to the location, for example, on a coil and can be placed at that location not only horizontally, but particularly also vertically. The cable closed off by this method can thereby be advantageously pulled up to a platform of a wind power plant located at a height of approximately 20 m to 50 m above ground level and can be secured to the plant with fastening elements which act on the pipe piece remaining on the cable end. For this purpose, the pipe piece can be equipped advantageously with parts of a fastening device in which corresponding parts of the fastening device, which are mounted on the platform, can engage. This significantly simplifies securing of the end of the cable to the platform. It can be carried out without significant further assembly steps in the same work step after pulling the cable up.

For the electrical connection of the cable to a device located on the platform, which as already mentioned may be a transformer or a switching plant, after fixing of the cable end only the sleeve has to be removed from the pipe piece. The transmission elements of the cable are then exposed for further processing.

BRIEF DESCRIPTION OF THE DRAWINGS

The method according to the invention and the device manufactured by the method will be explained with the aid of the drawings which show embodiments:

FIG. 1 schematically shows the lower end of a foundation of a wind power plant.

FIG. 2 shows a device manufactured by the method according to the invention.

FIG. 3 shows an embodiment of the device modified as compared to FIG. 2.

FIG. 4 schematically shows the end of the cable secured to a foundation.

DETAILED DESCRIPTION

The method according to the invention, as already mentioned, is intended particularly for securing an energy cable constructed as an underwater cable to a platform placed on the sea floor. The energy cable—in the following further called "cable" for short—advantageously has three high voltage cables which are stranded together and which together form the center axis of the cable.

The lower part of a foundation of a wind power plant is designated by reference numeral 1 which is placed on the ground 2 and is located, for example, 30 m above ground level in a so-called offshore area. The foundation 1 includes a platform 3 which is located approximately 30 m above ground level 2. A transformer and/or a switching plant may be arranged on the platform 3, as well as other electrical devices which are also not illustrated. They are connected particularly electrically to a generator at the tip of the foundation 1.

The end of the cable 4 projects through the platform 3, which is placed on the ground level and is pulled up to the platform 3. The cable 4 can with its free end lead, for example, to another wind power plant or to a transformer station.

The center axis 5 of the cable 4 is surrounded by a reinforcement 6 composed of tension proof metal wires. The metal wires advantageously consist of galvanized steel. They can be constructed as round or flat wires and are placed tightly against the center axis 5.

The reinforcement 6 is removed at the end of the cable over a predetermined length, so that the axis 5 is exposed over this length. Pushed onto the end of the reinforcement 6 remaining in the cable 4 is a pipe piece 7, preferably of high grade steel, which rests tightly against the reinforcement 6.

In the illustrated embodiment, the center axis 5 is additionally surrounded by a clamping ring 8 of metal on which the metal wires of the reinforcement 6 rest. They are located in the assembly position between the clamping ring 8 and the pipe piece 7 and are thus clamped between these two parts.

A cup like tubular elongated sleeve 9 of high grade steel which projects up to the pipe piece 7 is arranged above the end of the center axis 5 of the cable 4. At its free end the elongated sleeve 9 has a device suitable for mounting a tension element which, in the illustrated embodiment, is constructed as an eyelet 10. The sleeve 9 advantageously has a ring 11 which in the mounted position surrounds the end of the pipe piece 7. For achieving a tension proof connection of ring 11 and pipe piece 7, at least three screws 12 can be used which, distributed over the circumference of the ring 11, penetrate through the ring 11 and project into the pipe piece 7. For this purpose, the ring 11 may have a corresponding number of threaded bores and the pipe piece 7 can either have holes or advantageously a circumferential groove.

The ring 11 may also be provided with an internal thread which, in the assembled state, engages in an external thread provided on the pipe piece 7. For the additional safety of the relative positions of sleeve 9 and pipe piece 7 relative to each other, it is also possible to mount the screws 12. In both versions sleeve 9 and pipe piece 7 are fixedly connected to each other. The end of the center axis 5 can be covered by a cap 13.

In the assembled state, in the embodiment of the device according to FIG. 2, the metal wires of the reinforcement 6 are clamped between the pipe piece 7 and the clamping ring 8 which, for this purpose, have conical contact surfaces which correspond to each other. As a result, this produces a tension proof connection between the pipe piece 7 and the reinforcement 6. Consequently, the cable 4 can therefore be pulled in its longitudinal direction by a tension element acting on the pipe piece 7. A corresponding tension proof connection could also be realized by welding the pipe piece 7 and the metal wires of the reinforcement 6 together. As a result, in this embodiment, the clamping ring 8 is not required. However it is also possible, if the clamping ring 8 is used in the described manner, to additionally weld the metal wires of the reinforcement 6 to the pipe piece 7 and/or to the clamping ring 8.

Basically, the same configuration of the device as it has been described for FIG. 2 is also applicable to FIG. 3. However, while the sleeve 9 in the device according to FIG. 2 is constructed as a smooth pipe, in the embodiment according to FIG. 3 in the assembled state, a pipe is used as the sleeve 9 which is undulated transversely of its longitudinal direction. This makes the pipe easily bendable. As a result of the configuration of the device, this embodiment of the device is advantageous if the reinforcement 6 is removed over a greater length from the end. of the cable 1. The appropriately prepared end of the cable 4 prepared with the use of an undulated pipe can thus be "unwound," so that it no longer projects beyond the profile of the coil. For stabilizing the undulated pipe of the sleeve 9, it is possible to mount a tension proof layer 14 around the sleeve 9, for example, which has a woven material of metal wires which advantageously consist of high grade steel.

In a preferred embodiment, the pipe piece 7 has, at its outer surface, parts of a fastening device whose complementary parts are mounted on the platform 3. As part of such a fastening device, at least one circumferential groove 15 with preferably rectangular cross section is mounted in the pipe piece 7. Such a part of a fastening device has the advantage that it does not protrude beyond the profile of the pipe piece 7 and that it does not constitute an oversized part when the cable is placed.

In accordance with the invention, a method for manufacturing a device according to FIG. 2 is carried out, for example, as follows:

The reinforcement 6 of the cable 4 is removed over a predetermined length from the cable end, possibly including any layers surrounding the reinforcement 6. The cap 13 is placed on the center axis 5 of the cable 4. The pipe piece 7 is pushed onto the cable end to such an extent that it tightly surrounds the metal wires of the remaining reinforcement 6. The clamping ring 8, provided with a conical outer surface, is pushed onto the cable end until it engages under the metal wires of the reinforcement 6 and whose ends are pressed against the conical inner surface of the pipe piece 7. In this regard, a pressure acting in axial direction is applied on the clamping ring 8 such that the metal wires of the reinforcement 6 are clamped in a tension proof manner. The metal wires of the reinforcement 6 can additionally be welded to the pipe piece 7 and/or the clamping ring 8.

Subsequently, in accordance with a possible embodiment, the sleeve 9 prepared in this manner is connected to the pipe piece 7 by means of the ring 11. This position is indicated by at least three screws 12—two screws 12 are indicated—which extend through the ring 11 and project into the pipe piece 7. The end of the construction of the cable 4 is now finished.

The described method can be carried out in connection with a cable which is already wound onto a coil. However, the cable can also be wound onto a coil after the tension proof connection has been carried out.

Cable 4 is mounted so as to extend to the platform 3 of a wind power plant and is further pulled in the above described sense through an opening 16 schematically illustrated in FIG. 4. The end of the cable can then be secured through the pipe piece 7, in the embodiment illustrated in the drawings, and can be advantageously held at the platform by means of a holding flange consisting of two parts 17 and 18 which engage, in the assembled position, in the groove 15 of the pipe piece 7. The parts 17 and 18 of the holding flange are to be fixedly connected to the platform 3. The sleeve 9 can then be removed from the cable 4 so that the center axis 5 thereof, which in accordance with FIG. 4 may consist of three high voltage cables, is available for electrical connections to appropriate devices.

The invention claimed is:

1. Method for a tension proof closing of the end of an energy cable, and to connect the cable to at least one device, which is mounted on a platform of a wind power plant within an offshore area, in which an energy cable is used whose core contains electrical transmission elements, is surrounded by a reinforcement of metal wires, said method comprising the steps of:

that initially the reinforcement at the end of the energy cable is removed over a predetermined length, that subsequently a metal pipe piece is mounted on the end of the remaining reinforcement, tightly surrounding the remaining reinforcement, and is welded to the same, subsequently a cup shaped tubular elongated metal sleeve is pushed onto the end of the energy cable and is connected in a tension proof manner to the metal pipe piece which, at its free end facing away from the metal pipe piece, has a device suitable for mounting a tension element; and wherein said metal pipe piece has, on its outside, parts of a fastening device for securing the device to the stationary plant.

2. Method according to claim 1, wherein the pipe piece and the reinforcement are welded together.

3. Method according to claim 1, wherein a clamping ring is pushed under the end of the remaining reinforcement onto the center axis of the energy cable through which the metal wires of the reinforcement are pressed with a tension proof connection against the pipe piece.

4. Method according to claim 3, wherein the metal wires of the reinforcement are welded to the pipe piece, as well as to the clamping ring.

5. Method according to claim 1, wherein the sleeve and the pipe piece are connected to one another by screws, wherein the screws penetrate the ring or project into the pipe piece.

6. Method according to claim 1, wherein the sleeve provided with an internal thread is screwed with its open end onto the pipe piece provided with an external thread.

7. Method of connecting an electrical device located on a platform of a wind power plant, said method comprising the step of employing an energy cable manufactured in accordance with claim 1.

* * * * *